United States Patent
Wodrich et al.

(10) Patent No.: US 11,275,175 B2
(45) Date of Patent: Mar. 15, 2022

(54) METHOD FOR DETECTING OBJECTS VIA A VEHICULAR SENSING SYSTEM

(71) Applicant: MAGNA ELECTRONICS INC., Auburn Hills, MI (US)

(72) Inventors: Helmut A. Wodrich, Clarkston, MI (US); Tzu-Nan Chen, Zhubei (TW); Chien Wen Lai, Zhubei (TW); Jerome Petit, Thouare sur Loire (FR)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 4 days.

(21) Appl. No.: 16/948,178

(22) Filed: Sep. 8, 2020

(65) Prior Publication Data

US 2021/0026009 A1    Jan. 28, 2021

Related U.S. Application Data

(63) Continuation of application No. 15/619,627, filed on Jun. 12, 2017, now Pat. No. 10,768,298.

(60) Provisional application No. 62/349,874, filed on Jun. 14, 2016.

(51) Int. Cl.
  *G01S 13/931* (2020.01)
  *G01S 15/87* (2006.01)
  *B60Q 9/00* (2006.01)
  *G01S 15/931* (2020.01)
  *G01S 13/87* (2006.01)

(52) U.S. Cl.
  CPC ............ *G01S 13/931* (2013.01); *B60Q 9/006* (2013.01); *G01S 13/87* (2013.01); *G01S 15/87* (2013.01); *G01S 15/931* (2013.01); *G01S 2013/9314* (2013.01); *G01S 2013/9315* (2020.01); *G01S 2013/93274* (2020.01)

(58) Field of Classification Search
  CPC ........ G01S 13/931; G01S 13/87; G01S 15/87; G01S 15/931; G01S 2013/9315; G01S 2013/93274; G01S 2013/9314; B60Q 9/006
  USPC .......................................... 342/70
  See application file for complete search history.

(56) References Cited

U.S. PATENT DOCUMENTS

| | | |
|---|---|---|
| 5,767,793 A | 6/1998 | Agravante et al. |
| 5,949,331 A | 9/1999 | Schofield et al. |
| 6,587,186 B2 | 7/2003 | Bamji et al. |

(Continued)

FOREIGN PATENT DOCUMENTS

| | | |
|---|---|---|
| WO | 2011090484 A1 | 7/2011 |
| WO | 2018007995 A1 | 1/2018 |

*Primary Examiner* — Peter M Bythrow
*Assistant Examiner* — Nuzhat Pervin
(74) *Attorney, Agent, or Firm* — Honigman LLP

(57) ABSTRACT

A sensing method and system includes equipping a vehicle with a first sensor at a forward portion of a side of the vehicle such that a principal axis of the first sensor's zone of sensing is rearward and sideward and at an acute angle relative to the body, and a second sensor at a rearward portion of the side of the vehicle such that a principal axis of the second sensor's zone of sensing is forward and sideward and at an acute angle relative to the body. Data sensed by the sensors when each sensor senses with zone of sensing and an adjusted zone of sensing are communicated to a control, which determines the presence of one or more objects exterior the vehicle and within the zone of sensing and the adjusted zone of sensing of the at least one of the sensors.

36 Claims, 7 Drawing Sheets

(56) References Cited

U.S. PATENT DOCUMENTS

| | | |
|---|---|---|
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,580,795 B2 | 8/2009 | McCarthy et al. |
| 8,013,780 B2 | 9/2011 | Lynam |
| 8,027,029 B2 | 9/2011 | Lu et al. |
| 8,665,079 B2 * | 3/2014 | Pawlicki ............ B60W 30/143 340/435 |
| 8,698,894 B2 | 4/2014 | Briggance |
| 9,036,026 B2 | 5/2015 | Dellantoni et al. |
| 9,146,898 B2 | 9/2015 | Ihlenburg et al. |
| 9,193,321 B2 | 11/2015 | Dingman |
| 9,524,597 B2 * | 12/2016 | Ricci ..................... B60R 25/01 |
| 9,575,160 B1 | 2/2017 | Davis et al. |
| 9,586,138 B2 * | 3/2017 | Wei .......................... A63F 13/28 |
| 9,599,702 B1 | 3/2017 | Bordes et al. |
| 9,689,967 B1 | 6/2017 | Stark et al. |
| 9,753,121 B1 | 9/2017 | Davis et al. |
| 9,977,593 B2 * | 5/2018 | Ricci ..................... G06F 11/328 |
| 10,004,458 B2 * | 6/2018 | Toth ..................... A61B 5/6852 |
| 10,768,298 B2 | 9/2020 | Wodrich et al. |
| 2003/0034883 A1 | 2/2003 | Sato et al. |
| 2006/0139181 A1 | 6/2006 | Danz et al. |
| 2006/0206243 A1 | 9/2006 | Pawlicki et al. |
| 2008/0211708 A1 * | 9/2008 | Haberland ............ G01S 13/931 342/27 |
| 2009/0147083 A1 | 6/2009 | Pawlicki et al. |
| 2009/0242310 A1 | 10/2009 | Touge |
| 2010/0001897 A1 | 1/2010 | Lyman |
| 2010/0002081 A1 | 1/2010 | Pawlicki et al. |
| 2010/0245066 A1 | 9/2010 | Sarioglu et al. |
| 2011/0103650 A1 | 5/2011 | Cheng et al. |
| 2012/0062743 A1 | 3/2012 | Lynam et al. |
| 2012/0218412 A1 | 8/2012 | Dellantoni et al. |
| 2013/0063600 A1 | 3/2013 | Pawlicki et al. |
| 2013/0093613 A1 | 4/2013 | Itoh et al. |
| 2013/0215271 A1 | 8/2013 | Lu |
| 2013/0222592 A1 | 8/2013 | Gieseke |
| 2014/0218529 A1 | 8/2014 | Mahmoud et al. |
| 2014/0219506 A1 | 8/2014 | Foltin |
| 2014/0375476 A1 | 12/2014 | Johnson et al. |
| 2015/0124096 A1 | 5/2015 | Koravadi |
| 2015/0138011 A1 * | 5/2015 | Hiramaki .............. G01S 15/931 342/118 |
| 2015/0158499 A1 | 6/2015 | Koravadi |
| 2015/0185319 A1 | 7/2015 | Matsuura et al. |
| 2015/0251599 A1 | 9/2015 | Koravadi |
| 2015/0352953 A1 | 12/2015 | Koravadi |
| 2016/0036917 A1 | 2/2016 | Koravadi et al. |
| 2016/0098612 A1 | 4/2016 | Viviani |
| 2016/0200240 A1 | 7/2016 | Quinlan et al. |
| 2016/0210853 A1 | 7/2016 | Koravadi |
| 2017/0129489 A1 | 5/2017 | Pawlicki et al. |
| 2017/0205506 A1 * | 7/2017 | Voorheis ................. G01S 13/66 |
| 2017/0212231 A1 | 7/2017 | Iwai et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0285161 A1 * | 10/2017 | Izzat ..................... G01S 13/931 |
| 2017/0315231 A1 | 11/2017 | Wodrich |
| 2018/0015875 A1 | 1/2018 | May et al. |
| 2018/0045812 A1 | 2/2018 | Hess |
| 2018/0059236 A1 | 3/2018 | Wodrich et al. |
| 2018/0065623 A1 | 3/2018 | Wodrich et al. |
| 2018/0067194 A1 | 3/2018 | Wodrich et al. |
| 2018/0074191 A1 * | 3/2018 | Bilik ..................... G01S 13/931 |
| 2018/0105176 A1 | 4/2018 | Pawlicki et al. |
| 2018/0231635 A1 | 8/2018 | Woehlte |
| 2018/0231657 A1 | 8/2018 | Woehlte |
| 2018/0299533 A1 | 10/2018 | Pliefke et al. |
| 2019/0061760 A1 | 2/2019 | Pawlicki et al. |
| 2019/0072666 A1 | 3/2019 | Duque Biarge et al. |
| 2019/0072667 A1 | 3/2019 | Duque Biarge et al. |
| 2019/0072668 A1 | 3/2019 | Duque Biarge et al. |
| 2019/0072669 A1 | 3/2019 | Duque Biarge et al. |
| 2019/0120951 A1 * | 4/2019 | Fischer ................... G01S 13/04 |
| 2019/0217775 A1 | 7/2019 | May et al. |

\* cited by examiner

| Object | Area ⑤ | Area ⑥ | Area ⑦ |
|---|---|---|---|
| Curb ⑧ | N/A | N | Y |
| Pole ⑨ | N | Y | N |
| No Object | N | N | N |

METHOD FOR DETECTING OBJECTS VIA A VEHICULAR SENSING SYSTEM

CROSS REFERENCE TO RELATED APPLICATIONS

The present application is a continuation of U.S. patent application Ser. No. 15/619,627, filed Jun. 12, 2017, now U.S. Pat. No. 10,768,298, which claims the filing benefits of U.S. provisional application Ser. No. 62/349,874, filed Jun. 14, 2016, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

Ultrasonic sensors and system have been used for over twenty years for detection of objects in close proximity to the front and rear of vehicles. In order to provide coverage across the entire area forward or rearward of the vehicle, sensors are typically spaced between 50-90 cm apart across the front and rear bumpers of the vehicle. Through the use of triangulation, the ultrasonic signal transmitted by a single sensor may be received by any of the sensors, including the sensor originally transmitting. Ultrasonic sensors typically are unable to detect objects closer than 17 cm from the sensor. This relates to the sensor being used as both transmitter and receiver. The sensor's settling time, (the duration required for vibration of the transducer to end after the end of the transmit cycle), is about 1 ms. During this time, the sensor is unable to detect objects. Advanced electronic methods have recently decreased this range where objects cannot be detected to 10 cm, for large objects exceeding the residual vibrations magnitude within the last 0.4 ms of the settling time. Systems are unable to report objects closer than this range.

SUMMARY OF THE INVENTION

The present invention provides a driver assistance system or sensing system for a vehicle that utilizes one or more short range ranging sensors (such as ultrasonic sensors or the like having a sensing range of less than around 50 m, or less than around 25 m or less than around 15 m) disposed at the vehicle to sense respective regions exterior of the vehicle, with the sensors or sensor units comprising a plurality of sensors disposed along each side of the vehicle, with the plurality of sensors including at least (i) a first sensor disposed at a forward portion of the side of the vehicle such that a principal axis of the first sensor's field of sensing is rearward and sideward and at an angle relative to the body with a side boundary of the first sensor's field of sensing being parallel to or intersecting the side of the vehicle, and (ii) a second sensor disposed at a rearward portion of the side of the vehicle such that a principal axis of the second sensor's field of sensing is forward and sideward and at an angle relative to the body with a side boundary of the second sensor's field of sensing being parallel to or intersecting the side of the vehicle. Outputs of or sensor data sensed by the sensors (when sensing with different fields or zones of sensing) are communicated to a control and, responsive to the outputs of the sensor unit, the control determines the presence of one or more objects exterior the vehicle and within the field of sensing or zone of sensing of at least one of the sensors. The control may adjust the field or zone of sensing of the sensors by adjusting at least one of signal gain and signal threshold levels to obtain predetermined shaping of the field or zone of sensing.

These and other objects, advantages, purposes and features of the present invention will become apparent upon review of the following specification in conjunction with the drawings.

DESCRIPTION OF THE PREFERRED EMBODIMENTS

A vehicle sensing system, such as a driver assist system, object detection system, parking assist system and/or alert system, operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space. The system includes a processor that is operable to receive sensing data from multiple sensors and to provide an output to a control that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle).

Systems have migrated from being disposed at the rear of the vehicle only (4 sensors) to being disposed at both the front and rear of the vehicle (8 sensors) to 12 sensors capable of supplementing the detection of objects at the corners of vehicles and adding additional features such as automated parking. To support future features for autonomous vehicles, complete coverage, such as for the entire 360 degrees surrounding the vehicle, is required.

Figure 1:
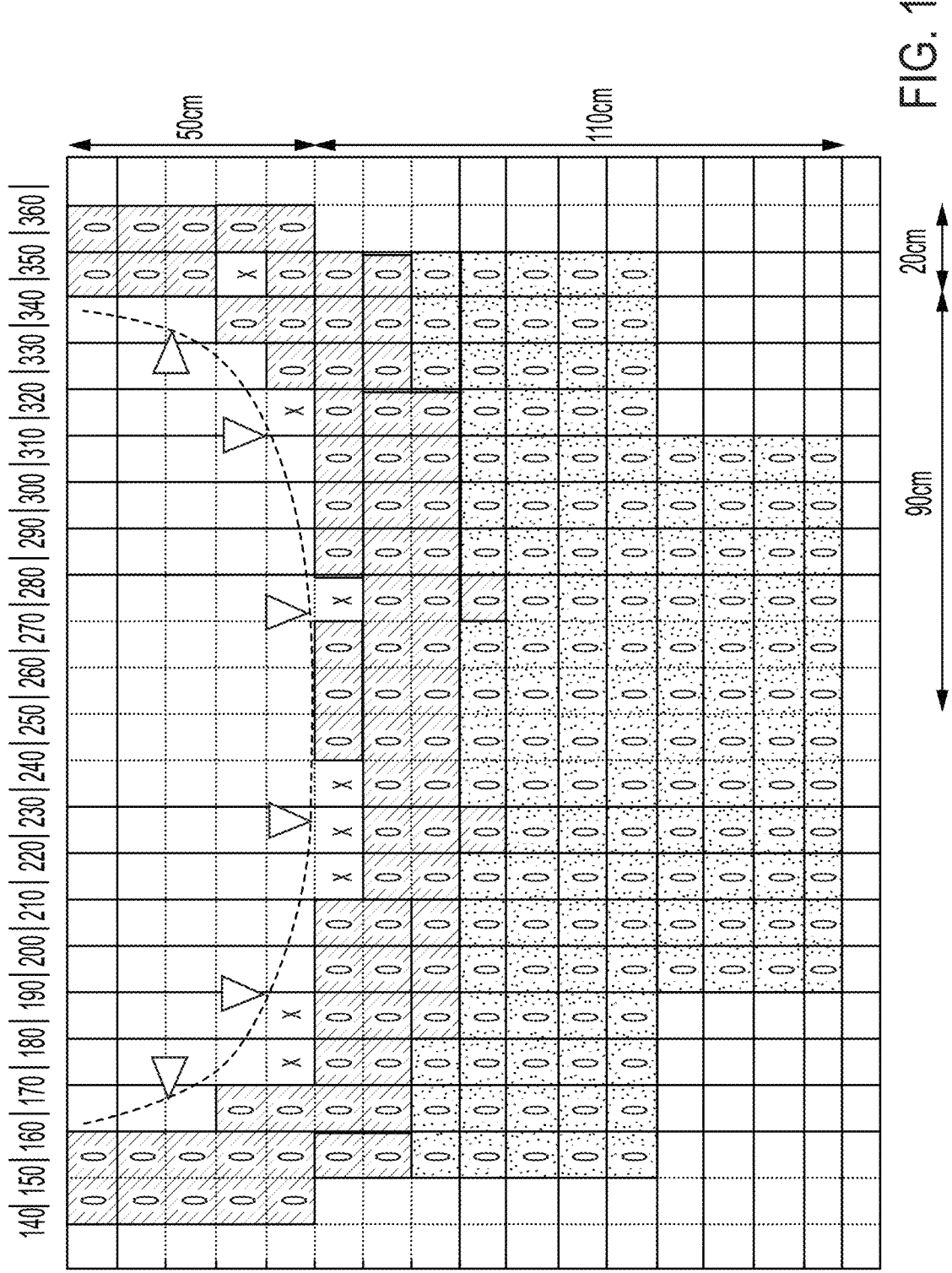
FIG. 1 is a diagram showing a typical sensor location and coverage for an ultrasonic parking assist (UPA) rear parking aid.
Figure 2:
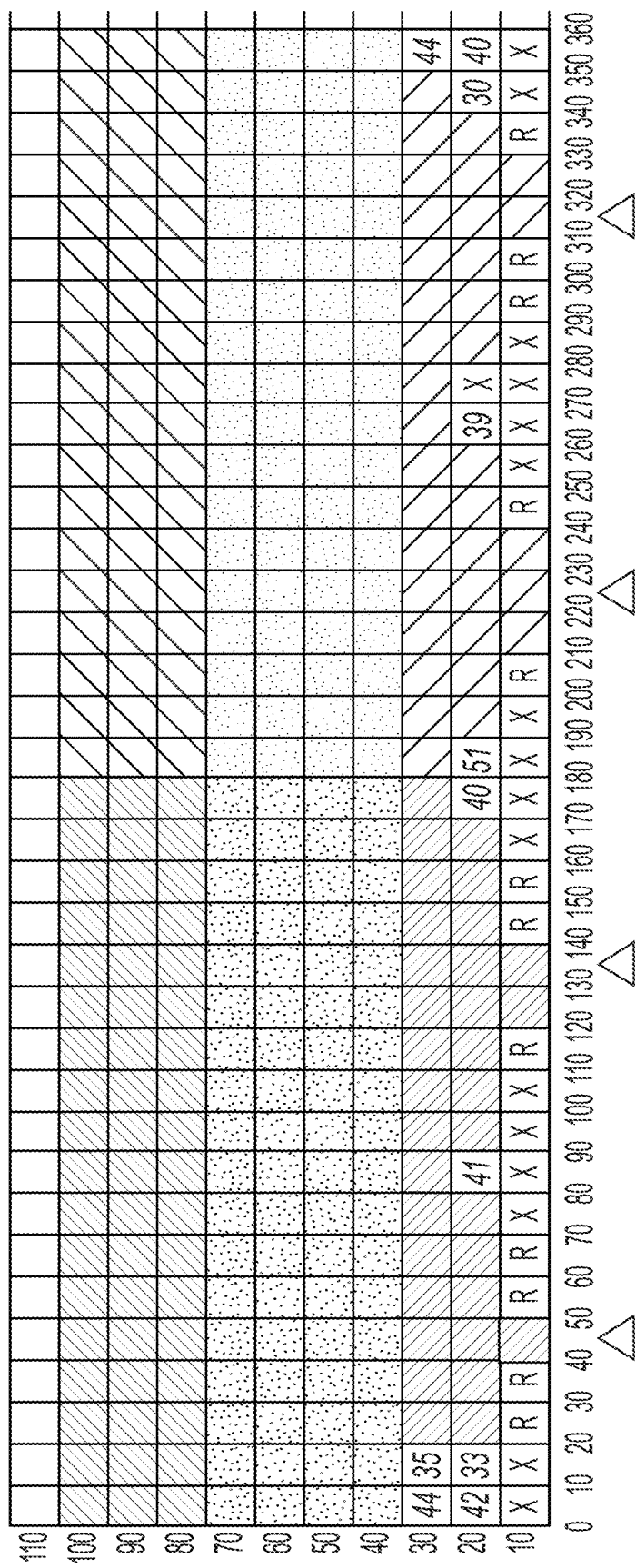
FIG. 2 is a diagram showing a coverage pattern alongside of vehicle, with about 90 cm between the sensors (perpendicular mounting)

It has been proposed to use ultrasonic sensors in a similar fashion along the sides of the vehicle. This solution is only partially viable due to the lack of potential locations for packaging the sensors, coverage degradation due to size of the wheel wells, and the like. Packaging in a typical fashion, with the sensor being approximately perpendicular to the body or fascia surface, also leaves a large percentage of the area in close proximity to the vehicle (such as within about one foot of the vehicle body) without detection capability. For certain vehicles, such as light commercial vehicles (LCV), the number of sensors required can result in an additional 6-8 sensors at each side of the vehicle to provide limited coverage. FIG. 2 shows the coverage results for a vehicle with a 430 cm wheelbase and 360 cm between the wheel wells of a LCV. In this example, coverage within about 1 ft. (30 cm), is capable to localize (accurate X-Y positioning) for only 63 percent (68 of 108 ten cm square locations) of the area immediately adjacent the vehicle.

Figure 3:
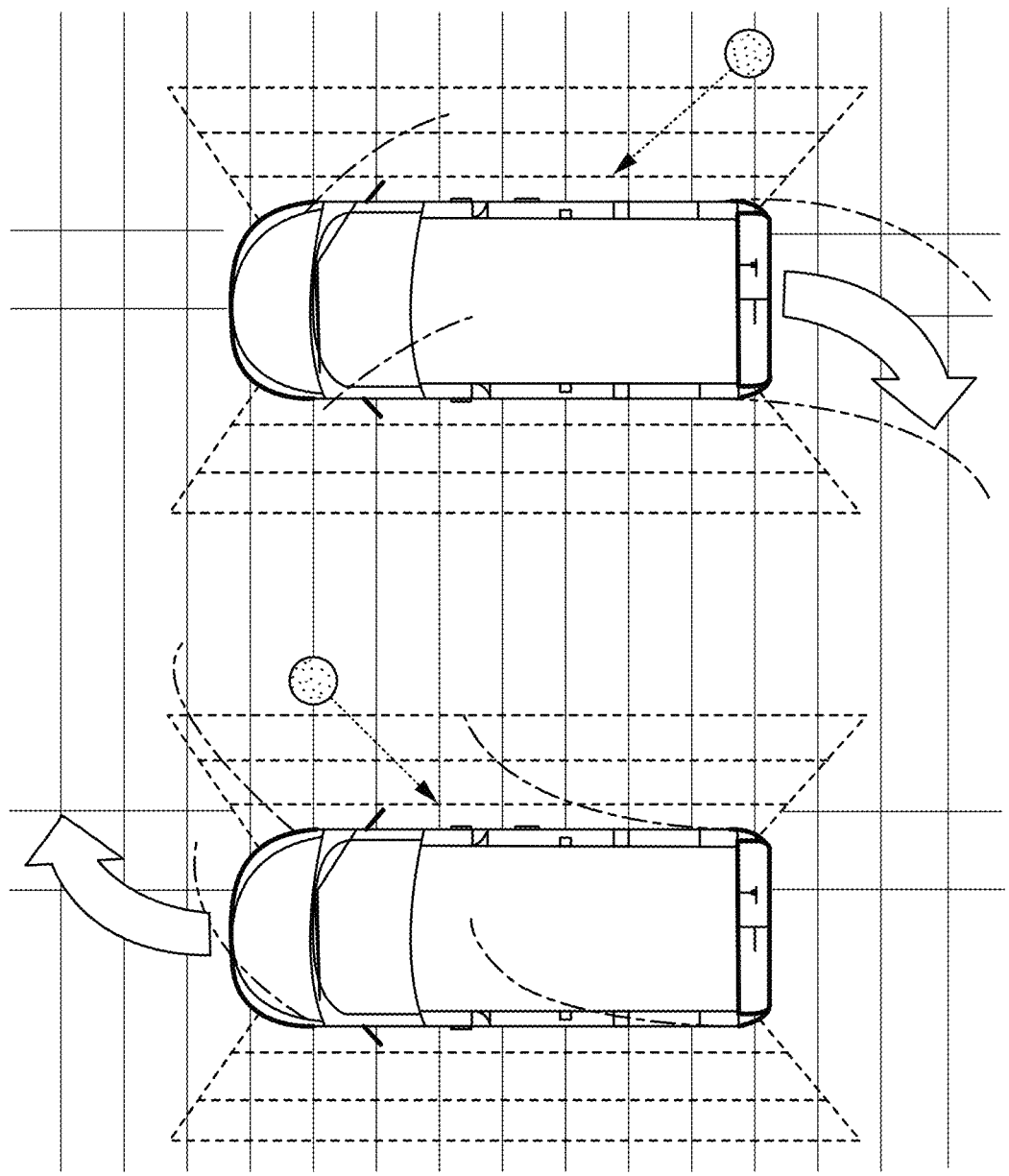
FIG. 3 is a plan view showing "drive tunnel" collision risks.

Although not unique to LCVs, the size and configuration of these vehicles make them especially susceptible to collision with obstacles located along the side of the vehicle or within the drive path (such as a drive tunnel or sweep of the vehicle body when turning), such as shown in FIG. 3.

Existing systems use tracking of objects first seen in the front or rear sensing field of view (FOV) or field of sensing to provide warnings or alerts to the vehicle driver of objects along the side of the vehicle. This technique can provide information to a driver when initially approaching a parking location, but cannot detect objects that are placed next to a vehicle after the vehicle is parked. Additionally, due to the large size of a LCV, low objects may not appear in the field of view of the driver's mirrors, presenting a risk for collisions as the vehicle's drive tunnel may intersect with the position of these objects when turning the vehicle (see FIG. 3).

Ultrasonic sensing systems have provided the ability to obtain an accurate X-Y positioning for objects at or near the front and rear of a vehicle. The system of the present invention provides a means of attaining X-Y positioning along the side of a vehicle, using a quantity of sensors greatly reduced from typical approaches. In addition, the system provides a method of eliminating the potential effects of detection of the body structure of the vehicle and associated false detection reports, while maintaining reporting capability for objects within about 10 cm of the body side. An added benefit is the ability to add information regarding the height of objects detected in the area of coverage.

The system of the present invention comprises a plurality of sensors positioned along the sides (including front, rear, driver and passenger sides or regions) of a vehicle to provide 360 degrees of coverage. The present invention positions certain sensors at an angle to the body, whereby the edge of the sensor's field of view is either parallel to or intersects the body. This method provides superior coverage of the area adjacent to the vehicle. It is envisioned that the sensors positioned adjacent to the wheel wells are packaged in a wheel flare, mud flaps or other decorative trim element to obtain the required orientation. The sensors may sense and detect objects near to the vehicle, such as having a sensing range of less than around 50 m, or less than around 25 m or less than around 15 m. The sensors may comprise ultrasonic sensors or radar sensors or lidar sensors or the like.

Multiple horizontal and vertical fields of view/sensing are created using a combination of signal gain and/or threshold adjustments. Using a comparative method and the signature response of the body side, the response due to the return echo from the body side can be cancelled to obtain a clear image of the area adjacent to the side of a vehicle, and localization of objects along the entire side of the vehicle. Comparing responses from multiple signal gain and/or threshold settings in the vertical FOV provides the ability to discriminate between low profile objects, such as, for example, curbs, poles, walls and the like.

Figure 4:
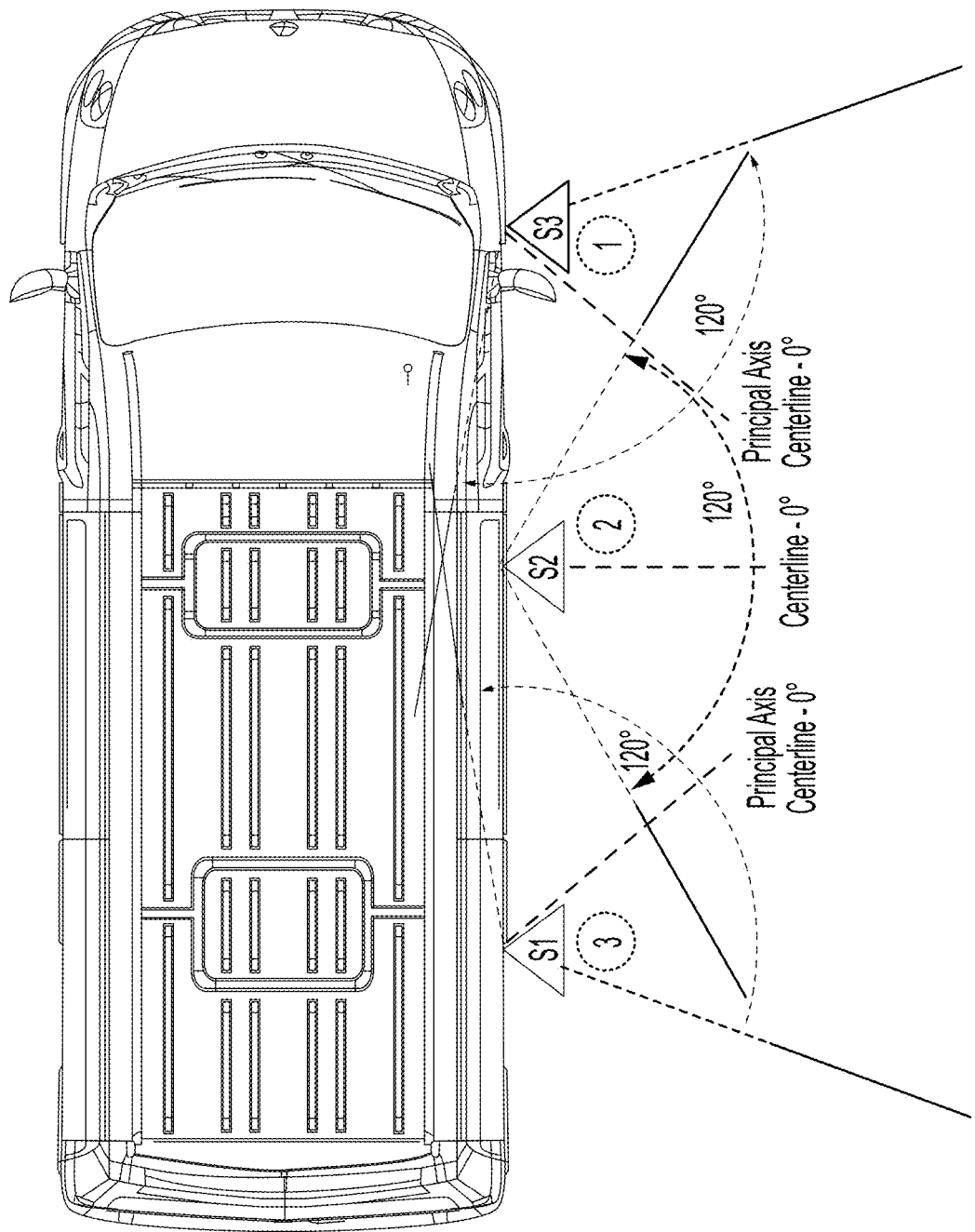
FIG. 4 is a plan view of a vehicle showing the positioning of sensors for a full flank protection in a light commercial vehicle (LCV)
Figure 5A:
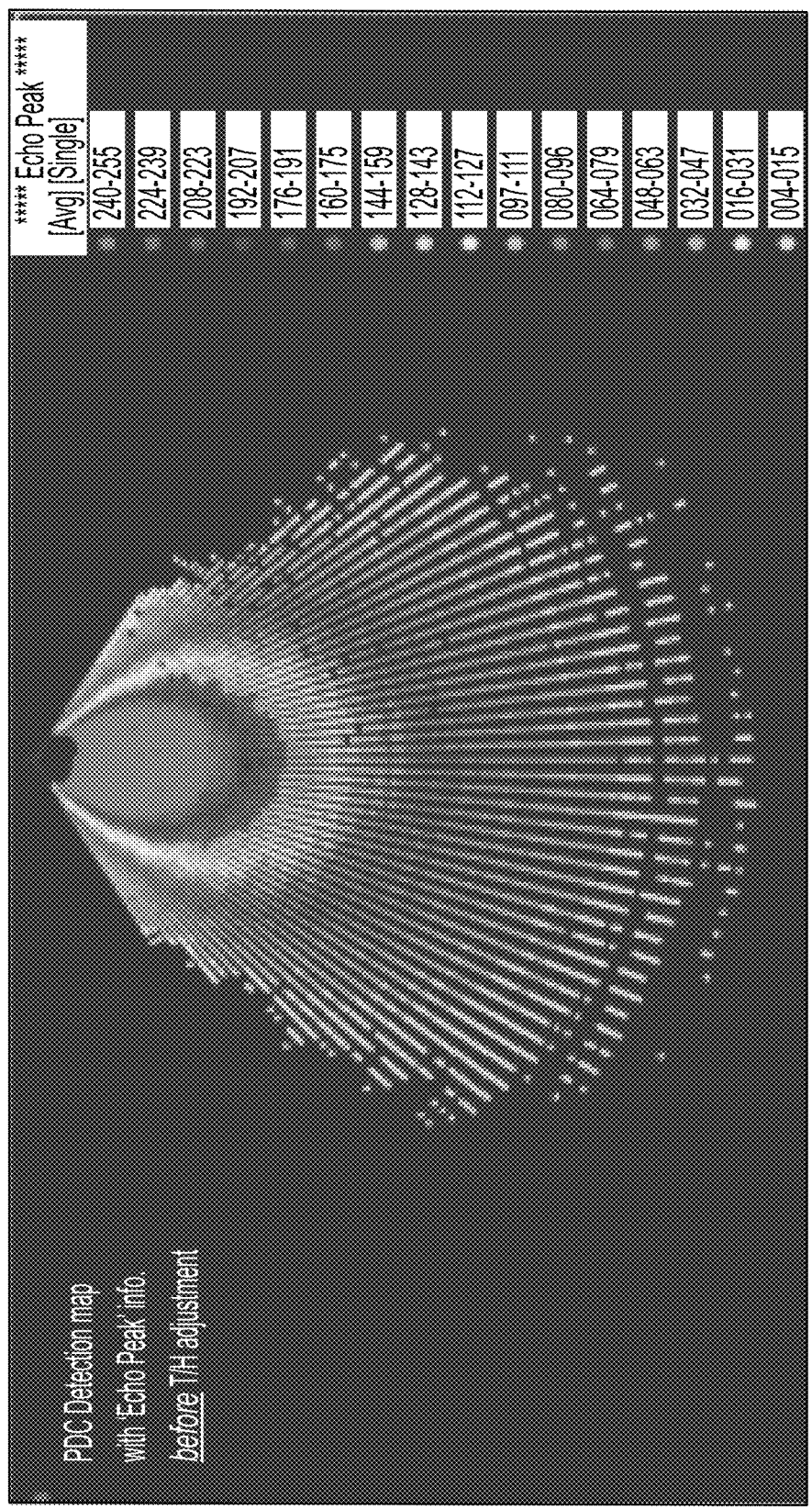
FIGS. 5A and 5B show comparative fields of view or fields of sensing of a sensor using a threshold adjustment.
Figure 5B:
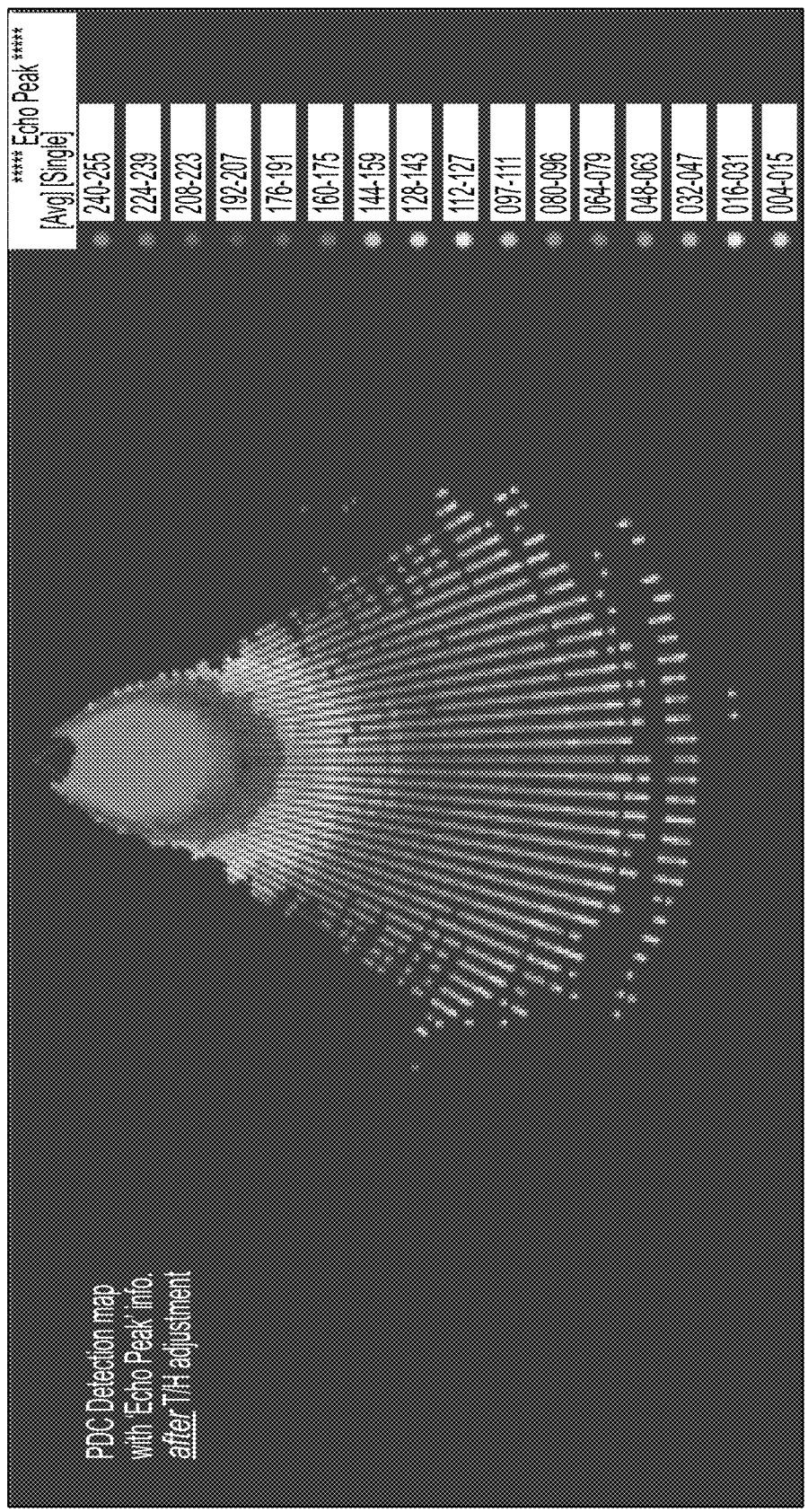

In accordance with the present invention, and such as shown in FIG. 4, a plurality of sensors are disposed at the side of the vehicle. The sensors include (i) a sensor 1 disposed at the rear of the front wheel well and angled rearward such that the sensor's FOV intersects or is parallel with the vehicle body side, (ii) a sensor 2 disposed at approximately the midpoint between the front and rear wheel wells, and (iii) a sensor 3 disposed at the front of the rear wheel well and angled forward such the sensor's FOV intersects or is parallel with the vehicle body side. As can be seen in FIG. 4, the principal axes of the sensors 1, 3 are angled rearward and forward, respectively, and the side boundaries of the sensors' fields of sensing intersect the side of the vehicle rearward/forward of the respective sensor (or the side boundaries may be parallel to the side of the vehicle). The center sensor 2 has its principal axis generally normal to the side of the vehicle.

Where the sensors are positioned to have the horizontal FOV intersect the body side of the vehicle, cancellation of the return echo received at the sensors is achieved by comparing echo responses of the sensor within a series of transmit—receive cycles. Within these cycles, the shape and included angle of the FOV is altered by adjusting the signal gain and/or thresholds. Using a comparative method and the signature response of the body side, the response due to the return echo from the body side can be cancelled to obtain a clear image of the area adjacent to the side of a vehicle, and localization of objects along the entire side of the vehicle.

Figures 6, 7:
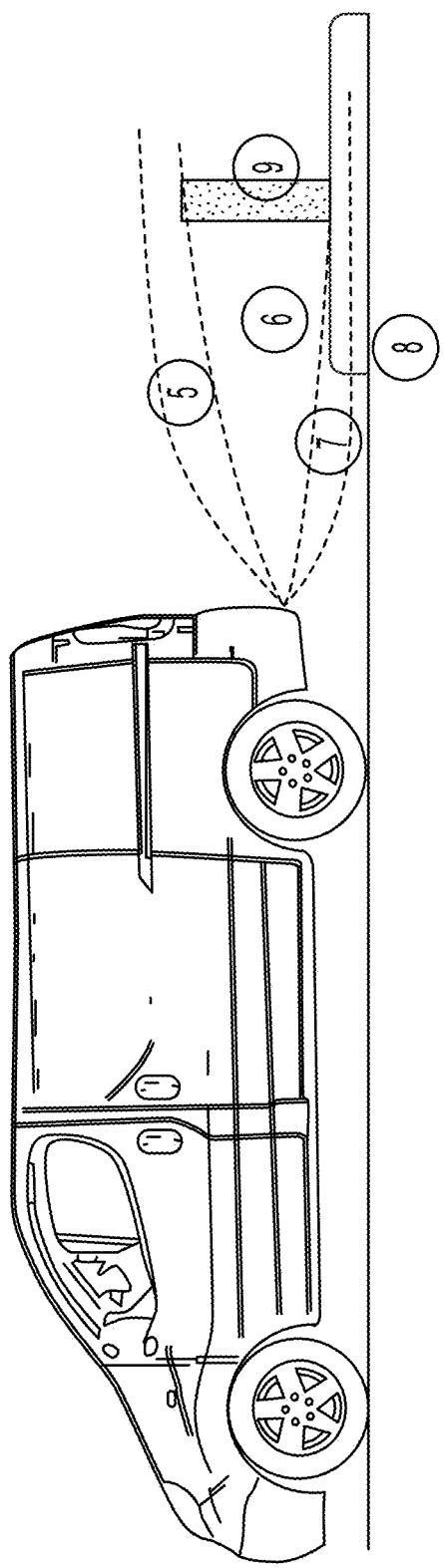
FIG. 6 is a side view of a vehicle showing an adjusted vertical field of view detection of low objects.
FIG. 7 is a logic table for detection classification of low objects.

Additionally, the shape and included angle of the FOV in the vertical axis can also be altered by adjusting the signal gain and/or thresholds. By adjusting the signal gain and/or thresholds, a vertical FOV of reduced area 6 (FIG. 6) can be created. By comparing ranges at which detections are received between the standard signal's gain/threshold settings (FOVs 5+6+7) with the modified signal's gain/threshold settings (FOV 6), a measure of the relative height of objects can be determined. In the example shown in FIG. 6, the curb 8 and post 9 may be identified via such comparisons. By analyzing the response from multiple sensors, the determination may be further refined to classify the low height object as a curb. This ability would permit the ultrasonic parking system to make determinations whether an object is low, and if a warning should be given, or whether an automated maneuver should be stopped prior to the rear of vehicle crossing the location of a low object. The system may allow the driver to make a selection to allow the vehicle to drive onto curbs, while preventing collision with taller objects or low objects of sufficient height that could damage the vehicle. Multiple settings are envisioned to create additional vertical FOVs, permitting further discrimination of lower profile objects.

Thus, the present invention provides a sensing system that positions sensors at an angle to the vehicle body, such that the edge (or boundary or side extent) of the sensor's field of view or sensing is parallel to or intersecting the body of the vehicle at which the sensor is disposed. The method of adjusting the sensor field of view or zone of sensing using signal gain and/or signal threshold levels obtains predetermined shaping of the field of view. The system includes sensors positioned such that a warning zone is provided for objects along the entire length of a vehicle. The system may provide or generate multiple fields of view of the horizontal and vertical coverage areas around the vehicle.

The system may use the warning zone to provide warnings to a driver or to limit motion of a vehicle or vehicle elements, such as a door, sliding door or liftgate for objects that could present a risk of collision or damage to the vehicle. The system may utilize comparisons of the multiple horizontal zones of sensing and/or a memorized signature response of the body to cancel reflections due to the vehicle to obtain a clear image of objects adjacent to the vehicle. The system may utilize comparisons of the multiple vertical fields/zones of view/sensing to classify low objects such as curbs, posts, and walls. The system thus provides a combination of sensors positioned substantially perpendicular to a vehicle's outer surface and sensors at an angle to the body, such that the edge or side boundary of the field of view/sensing is parallel to or intersecting the body of a vehicle, such that 360 degrees of coverage is provided around the entire vehicle and in close proximity to the body.

Because of cycle time impact, the system may include means of storing multiple settings in the chip or ASIC. Thus, the sensor may include integrated memory for storing multiple configuration settings of gains and thresholds. The gain or threshold may be adjusted or selected from the stored settings to provide the desired sensing.

Although described as having a plurality of ultrasonic sensors or sensor units disposed at the vehicle, the system of the present invention may utilize any suitable type of sensors, such as radar sensors, Lidar sensors, or the like. The means to adapt for the vehicle body response may be adjusted according to the type of sensors implemented in the sensing system.

Thus, a sensing system in accordance with the present invention comprises a plurality of sensors disposed along a side of a body of a vehicle. The sensors include a first sensor (such as sensor 1 in FIG. 4) disposed at a forward portion of the side of the vehicle that is forward of a transverse centerline of the vehicle such that a principal axis of the first sensor's zone of sensing extends rearward and sideward and at an angle less than 90 degrees relative to the body with a side boundary of the first sensor's zone of sensing being parallel to or intersecting the side of the body of the vehicle at which said sensors are disposed. The sensors also include a second sensor (such as sensor 3 in FIG. 4) disposed at a rearward portion of the side of the vehicle that is rearward of the transverse centerline of the vehicle such that a principal axis of the second sensor's zone of sensing extends forward and sideward and at an angle less than 90 degrees relative to the body with a side boundary of the second sensor's zone of sensing being parallel to or intersecting the side of the body of the vehicle at which said sensors are disposed. During operation of the sensing system, each of the sensors senses within a field or zone of sensing that is created using at least one of (i) signal gain made on each sensor and (ii) signal threshold made on each sensor. The zone of sensing for each of the sensors is adjusted to an adjusted zone of sensing using at least one of (i) signal gain adjustment made on each sensor and (ii) signal threshold adjustment made on each sensor. Sensor data sensed by the sensors with the zone of sensing and sensor data sensed by the sensors with the adjusted zone of sensing are communicated to a control. The control, responsive to processing of the communicated sensor data sensed by the sensors, determines the presence of one or more objects exterior the vehicle and within the zone of sensing and adjusted zone of sensing of at least one of the sensors. By comparing the sensor data sensed by the sensors with the zone of sensing to sensor data sensed by the sensors with an adjusted zone of sensing, the control and system may determine height of objects present in the zones of sensing of at least one of the sensors.

The sensing system of the present invention may utilize aspects of the systems described in U.S. Pat. Nos. 9,689,967; 9,599,702; 9,575,160; 8,013,780 and/or 5,949,331 and/or International Publication No. WO 2011/090484 and/or U.S. Publication No. US-2010-0245066 and/or U.S. patent application Ser. No. 15/584,265, filed May 2, 2017, now U.S. Pat. No. 10,534,081, Ser. No. 15/467,247, filed Mar. 23, 2017, now U.S. Pat. No. 10,571,562, Ser. No. 15/446,220, filed Mar. 1, 2017 and published Sep. 7, 2017 as U.S. Publication No. US-2017-0254873, and/or Ser. No. 15/420,238, filed Jan. 31, 2017 and published Aug. 3, 2017 as U.S. Publication No. US-2017-0222311, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for detecting objects via a vehicular sensing system, the method comprising:

equipping a vehicle with the vehicular sensing system, the vehicular sensing system comprising (i) a plurality of sensors disposed along an exterior side of a vehicle and (ii) a control;

wherein the plurality of sensors comprises a first sensor disposed at a forward portion of the exterior side of the vehicle that is forward of a transverse centerline of the vehicle such that a principal axis of a zone of sensing of the first sensor extends rearward and sideward at an angle less than 90 degrees and greater than 0 degrees relative to the exterior side of the vehicle, and wherein a side boundary of the zone of sensing of the first sensor that extends rearward is parallel to or intersecting the exterior side of the vehicle at which the first sensor is disposed;

wherein the plurality of sensors comprises a second sensor disposed at a rearward portion of the exterior side of the vehicle that is rearward of the transverse centerline of the vehicle such that a principal axis of a zone of sensing of the second sensor extends forward and sideward at an angle less than 90 degrees and greater than 0 degrees relative to the exterior side of the vehicle, and wherein a side boundary of the zone of sensing of the second sensor that extends forward is parallel to or intersecting the exterior side of the vehicle at which the second sensor is disposed;

creating a zone of sensing for each of the first sensor and the second sensor using at least one selected from the group consisting of (i) signal gain made on each of the first sensor and the second sensor and (ii) signal threshold made on each of the first sensor and the second sensor;

adjusting the zone of sensing for each of the first sensor and the second sensor to an adjusted zone of sensing using at least one selected from the group consisting of (i) signal gain adjustment made on each of the first sensor and the second sensor and (ii) signal threshold adjustment made on each of the first sensor and the second sensor;

communicating to the control sensor data sensed by the first and second sensors with the respective zones of sensing and sensor data sensed by the first and second sensors with the respective adjusted zones of sensing;

processing at the control the communicated sensor data sensed by the first and second sensors;

determining, at the control, and responsive to processing of the communicated sensor data sensed by the first and second sensors, presence of an object exterior the vehicle and within the zone of sensing and the adjusted zone of sensing of at least one selected from the group consisting of the first sensor and the second sensor; and determining height of the object present exterior the vehicle and within the zone of sensing and the adjusted zone of sensing of the at least one selected from the group consisting of the first sensor and the second sensor.

2. The method of claim 1, wherein determining height of the object present exterior the vehicle and within the zone of sensing and adjusted zone of sensing of the at least one selected from the group consisting of the first sensor and the second sensor comprises comparing at the control ranges at which detections are received when the first and second sensors are sensing with the respective zones of sensing with ranges at which detections are received when the first and second sensors are sensing with the respective adjusted zones of sensing.

3. The method of claim 1, further comprising generating via the control an alert responsive at least in part to the determined height of the determined object.

4. The method of claim 1, wherein adjusting the zone of sensing for each of the first sensor and the second sensor results in a narrower vertical adjusted zone of sensing of the first sensor and the second sensor as compared to the zone of sensing of the first sensor and the second sensor.

5. The method of claim 1, further comprising storing in memory multiple signal gain settings and signal threshold levels for the first sensor and the second sensor, wherein adjusting the zone of sensing of each of the first sensor and the second sensor uses the stored signal gain settings and stored signal threshold levels to obtain predetermined shaping of the zone of sensing.

6. The method of claim 1, further comprising generating multiple adjusted zones of sensing of horizontal and vertical coverage areas sideward of the exterior side of the vehicle.

7. The method of claim 6, further comprising providing warnings to a driver of the vehicle, responsive to detection of an object in a warning zone, to limit risk of collision or damage to the vehicle.

8. The method of claim 6, further comprising limiting motion of at least one vehicle element of the vehicle, responsive to detection of an object in a warning zone, to limit risk of damage to the vehicle, and wherein the at least one vehicle element comprise at least one selected from the group consisting of a door of the vehicle, a sliding door of the vehicle, and a liftgate of the vehicle.

9. The method of claim 6, further comprising utilizing comparisons of multiple horizontal zones of sensing to cancel reflections due to the exterior side of the vehicle to obtain a clear image of objects adjacent to the vehicle.

10. The method of claim 6, further comprising utilizing a memorized signature response of the exterior side of the vehicle to cancel reflections due to the exterior side of the vehicle to obtain a clear image of objects adjacent to the vehicle.

11. The method of claim 6, further comprising utilizing comparisons of multiple vertical zones of sensing to classify low profile objects.

12. The method of claim 1, wherein the plurality of sensors comprises a third sensor disposed at the exterior side of the vehicle between the first sensor and the second sensor, and wherein a principal axis of a zone of sensing of the third sensor's is normal to the exterior side of the vehicle.

13. The method of claim 12, wherein a combination of the first sensor, the second sensor and the third sensor at each exterior side of the vehicle and other sensors at the front and rear of the vehicle provides 360 degrees of coverage around the vehicle and less than 50 m from the vehicle.

14. The method of claim 1, wherein the plurality of sensors comprises a plurality of ultrasonic sensors.

15. The method of claim 1, wherein the plurality of sensors comprises a plurality of radar sensors.

16. The method of claim 1, wherein the vehicular sensing system provides short range detection for at least one selected from the group consisting of an automated parking system of the vehicle, a blind spot detection system of the vehicle, a cross traffic alert system of the vehicle, a lane change and merge aid system of the vehicle, an automatic emergency braking system of the vehicle, a pedestrian detection system of the vehicle, a turn assist system of the vehicle, and an intersection collision mitigation system of the vehicle.

17. A method for detecting objects via a vehicular sensing system, the method comprising:

equipping a vehicle with the vehicular sensing system, the vehicular sensing system comprising (i) a plurality of sensors disposed along an exterior side of a vehicle and (ii) a control;

wherein the plurality of sensors comprises a first sensor disposed at a forward portion of the exterior side of the vehicle that is forward of a transverse centerline of the vehicle such that a principal axis of a zone of sensing of the first sensor extends rearward and sideward at an angle less than 90 degrees and greater than 0 degrees relative to the exterior side of the vehicle, and wherein a side boundary of the zone of sensing of the first sensor that extends rearward is parallel to or intersecting the exterior side of the vehicle at which the first sensor is disposed;

wherein the plurality of sensors comprises a second sensor disposed at a rearward portion of the exterior side of the vehicle that is rearward of the transverse centerline of the vehicle such that a principal axis of a zone of sensing of the second sensor extends forward and sideward at an angle less than 90 degrees and greater than 0 degrees relative to the exterior side of the vehicle, and wherein a side boundary of the zone of sensing of the second sensor that extends forward is parallel to or intersecting the exterior side of the vehicle at which the second sensor is disposed;

creating a zone of sensing for each of the first sensor and the second sensor using at least signal gain made on each sensor;

adjusting the zone of sensing for each of the first and second sensors to an adjusted zone of sensing using at least signal gain adjustment made on each of the first sensor and the second sensor;

communicating to the control sensor data sensed by the first and second sensors with the respective zones of sensing and sensor data sensed by the first and second sensors with the respective adjusted zones of sensing;

processing at the control the communicated sensor data sensed by the first and second sensors;

determining, at the control, and responsive to processing of the communicated sensor data sensed by the first and second sensors, presence of an object exterior the vehicle and within the zone of sensing and the adjusted zone of sensing of at least one selected from the group consisting of the first sensor and the second sensor;

determining height of the object present exterior the vehicle and within the zone of sensing and the adjusted zone of sensing of the at least one selected from the group consisting of the first sensor and the second sensor; and wherein the vehicular sensing system provides object detection for at least one selected from the group consisting of an automated parking system of the vehicle, a blind spot detection system of the vehicle, a cross traffic alert system of the vehicle, a lane change and merge aid system of the vehicle, an automatic emergency braking system of the vehicle, a pedestrian detection system of the vehicle, a turn assist system of the vehicle, and an intersection collision mitigation system of the vehicle.

18. The method of claim 17, wherein determining height of the object present exterior the vehicle and within the zone of sensing and adjusted zone of sensing of the at least one selected from the group consisting of the first sensor and the second sensor comprises comparing at the control ranges at which detections are received when the first and second sensors are sensing with the respective zones of sensing with ranges at which detections are received when the first and second sensors are sensing with the respective adjusted zones of sensing.

19. The method of claim 17, further comprising generating via the control an alert responsive at least in part to the determined height of the determined object.

20. The method of claim 17, wherein adjusting the zone of sensing for each of the first sensor and the second sensor results in a narrower vertical adjusted zone of sensing of the first sensor and the second sensor as compared to the zone of sensing of the first sensor and the second sensor.

21. The method of claim 17, further comprising storing in memory multiple signal gain settings for the first sensor and the second sensor, wherein adjusting the zone of sensing of each of the first sensor and the second sensor uses the stored signal gain settings to obtain predetermined shaping of the zone of sensing.

22. The method of claim 17, further comprising generating multiple adjusted zones of sensing of horizontal and vertical coverage areas sideward of the exterior side of the vehicle.

23. The method of claim 17, wherein the plurality of sensors comprises a third sensor disposed at the exterior side of the vehicle between the first sensor and the second sensor, and wherein a principal axis of a zone of sensing of the third sensor's is normal to the exterior side of the vehicle.

24. The method of claim 23, wherein a combination of the first sensor, the second sensor and the third sensor at each exterior side of the vehicle and other sensors at the front and rear of the vehicle provides 360 degrees of coverage around the vehicle and less than 50 m from the vehicle.

25. The method of claim 17, wherein the plurality of sensors comprises a plurality of ultrasonic sensors.

26. The method of claim 17, wherein the plurality of sensors comprises a plurality of radar sensors.

27. A method for detecting objects via a vehicular sensing system, the method comprising:

equipping a vehicle with the vehicular sensing system, the vehicular sensing system comprising (i) a plurality of sensors disposed along an exterior side of a vehicle and (ii) a control;

wherein the plurality of sensors comprises a first sensor disposed at a forward portion of the exterior side of the vehicle that is forward of a transverse centerline of the vehicle such that a principal axis of a zone of sensing of the first sensor extends rearward and sideward at an angle less than 90 degrees and greater than 0 degrees relative to the exterior side of the vehicle, and wherein a side boundary of the zone of sensing of the first sensor that extends rearward is parallel to or intersecting the exterior side of the vehicle at which the first sensor is disposed;

wherein the plurality of sensors comprises a second sensor disposed at a rearward portion of the exterior side of the vehicle that is rearward of the transverse centerline of the vehicle such that a principal axis of a zone of sensing of the second sensor extends forward and sideward at an angle less than 90 degrees and greater than 0 degrees relative to the exterior side of the vehicle, and wherein a side boundary of the zone of sensing of the second sensor that extends forward is parallel to or intersecting the exterior side of the vehicle at which the second sensor is disposed;

creating a zone of sensing for each of the first sensor and the second sensor using at least signal threshold made on each of the first sensor and the second sensor;

adjusting the zone of sensing for each of the first sensor and the second sensor to an adjusted zone of sensing using at least signal threshold adjustment made on each of the first sensor and the second sensor;

communicating to the control sensor data sensed by the first and second sensors with the respective zones of sensing and sensor data sensed by the first and second sensors with the respective adjusted zones of sensing;

processing at the control the communicated sensor data sensed by the first and second sensors;

determining, at the control, and responsive to processing of the communicated sensor data sensed by the first and second sensors, presence of an object exterior the vehicle and within the zone of sensing and the adjusted zone of sensing of at least one selected from the group consisting of the first sensor and the second sensor;

determining height of the object present exterior the vehicle and within the zone of sensing and the adjusted zone of sensing of the at least one selected from the group consisting of the first sensor and the second sensor; and wherein the vehicular sensing system provides object detection for at least one selected from the group consisting of an automated parking system of the vehicle, a blind spot detection system of the vehicle, a cross traffic alert system of the vehicle, a lane change and merge aid system of the vehicle, an automatic emergency braking system of the vehicle, a pedestrian detection system of the vehicle, a turn assist system of the vehicle, and an intersection collision mitigation system of the vehicle.

28. The method of claim 27, wherein determining height of the object present exterior the vehicle and within the zone of sensing and adjusted zone of sensing of the at least one selected from the group consisting of the first sensor and the second sensor comprises comparing at the control ranges at which detections are received when the first and second sensors are sensing with the respective zones of sensing with ranges at which detections are received when the first and second sensors are sensing with the respective adjusted zones of sensing.

29. The method of claim 27, further comprising generating via the control an alert responsive at least in part to the determined height of the determined object.

30. The method of claim 27, wherein adjusting the zone of sensing for each of the first sensor and the second sensor results in a narrower vertical adjusted zone of sensing of the first sensor and the second sensor as compared to the zone of sensing of the first sensor and the second sensor.

31. The method of claim 27, further comprising storing in memory multiple signal threshold levels for the first sensor and the second sensor, wherein adjusting the zone of sensing of each of the first sensor and the second sensor uses the stored signal threshold levels to obtain predetermined shaping of the zone of sensing.

32. The method of claim 27, further comprising generating multiple adjusted zones of sensing of horizontal and vertical coverage areas sideward of the exterior side of the vehicle.

33. The method of claim 27, wherein the plurality of sensors comprises a third sensor disposed at the exterior side of the vehicle between the first sensor and the second sensor, and wherein a principal axis of a zone of sensing of the third sensor's is normal to the exterior side of the vehicle.

34. The method of claim 33, wherein a combination of the first sensor, the second sensor and the third sensor at each exterior side of the vehicle and other sensors at the front and rear of the vehicle provides 360 degrees of coverage around the vehicle and less than 50 m from the vehicle.

35. The method of claim 27, wherein the plurality of sensors comprises a plurality of ultrasonic sensors.

36. The method of claim 27, wherein the plurality of sensors comprises a plurality of radar sensors.

\* \* \* \* \*